United States Patent
Sakurai

(10) Patent No.: US 7,230,185 B2
(45) Date of Patent: Jun. 12, 2007

(54) CAP FOR WIRING PASS-THROUGH HOLE

(75) Inventor: Masanori Sakurai, Chiyoda-ku (JP)

(73) Assignee: Sugatsune Kogyo Co., Ltd., Tokyo (JP)

( * ) Notice: Subject to any disclaimer, the term of this patent is extended or adjusted under 35 U.S.C. 154(b) by 0 days.

(21) Appl. No.: 10/555,478

(22) PCT Filed: May 6, 2004

(86) PCT No.: PCT/JP2004/005974

§ 371 (c)(1),
(2), (4) Date: Nov. 3, 2005

(87) PCT Pub. No.: WO2004/098352

PCT Pub. Date: Nov. 18, 2004

(65) Prior Publication Data

US 2006/0207792 A1    Sep. 21, 2006

(30) Foreign Application Priority Data

May 7, 2003    (JP)    ............................. 2003-129566

(51) Int. Cl.
    *H02G 3/00*    (2006.01)
(52) U.S. Cl. .................. 174/100; 174/151; 174/152 R; 174/135; 439/752
(58) Field of Classification Search ................ 174/100, 174/151, 152 R, 153 R, 135, 68.1, 68.3; 439/521, 752, 470; 411/437, 999; 361/826
See application file for complete search history.

(56) References Cited

U.S. PATENT DOCUMENTS

| 6,706,970 | B2 * | 3/2004 | Laub et al. | .................. | 174/135 |
| 6,870,108 | B1 * | 3/2005 | Teng | ........................... | 174/100 |
| 7,048,581 | B1 * | 5/2006 | Wong | .......................... | 439/595 |
| 7,071,416 | B2 * | 7/2006 | Ricco et al. | ................. | 174/100 |
| 7,118,426 | B2 * | 10/2006 | Nakamura | ................... | 439/752 |
| 7,125,291 | B2 * | 10/2006 | Aihara | ....................... | 439/752 |

FOREIGN PATENT DOCUMENTS

| JP | 171783/1980 | 12/1980 |
| JP | 3723/1983 | 1/1983 |
| JP | 12944/1992 | 2/1992 |
| JP | 51024/1992 | 4/1992 |
| JP | 11-230425 A | 8/1999 |

* cited by examiner

*Primary Examiner*—Dhiru R. Patel
(74) *Attorney, Agent, or Firm*—Pearne & Gordon LLP

(57) ABSTRACT

First and second cylindrical members (1A) and (1B) are fitted into a wiring pass-through hole (H) in a wall board (Y) and engaged with each other in accordance with a thickness (D) of the wall board and first and second lid-like members (2A) and (2B) are fitted into openings of the first and second cylindrical members (1A) and (1B), respectively so as to be able to be removed out of the first and second cylindrical members (1A9 and (1B) whereby these cylindrical members are closed. A small quantity of wiring cord or cords pass through small quantity wiring pass-through openings (2a) and (2b) of the first and second lid-like members so as to arrange them in order. (By removing the first and second lid-like members (2A) and (2B) out of the first and second cylindrical members (1A) and (1B), a large quantity of wiring cords are allowed to pass through a large quantity wiring pass-through opening (4) defined by the first and second cylindrical members (1A) and (1B) so as to arrange them in order.

6 Claims, 5 Drawing Sheets

(A)

(B)

(A)

(B)

(A)

(B)

CAP FOR WIRING PASS-THROUGH HOLE

TECHNICAL FIELD

This invention relates to a cap suitable for use as a wiring pass-through hole provided in a wall of a top board or a side board of a desk or the like. The cap may be used for passing wiring cords drawn out of a floor surface or the like when the wiring cords should be connected to an electronic instrument such as a personal computer on an article of furniture such as a desk, a counter, a table, a panel or the like. The cap covers the wiring pass-through hole without detracting from the appearance of the article even when the wiring cords don't pass through the hole.

BACKGROUND OF TECHNOLOGY

Conventionally, there are known various caps for wiring pass-through hole adapted to cover the wiring pass-though hole provided in a wall of a desk or the like and an example of the commercial available caps is illustrated in FIGS. 5(A) and 5(B). The cap a comprises a diameter-reduced engagement cylindrical part b fitted into the wiring pass-through hole B previously provided in a top board A of the desk D and a removal prevention peripheral edge cover part c for engaging the upper surface of the top board A. This cap a is attached to the top board A by the diameter-reduced cylindrical part b and the peripheral edge cover part c thereof. As understood from FIG. 5(B), the removal prevention peripheral edge cover part c is provided with a partially opened wiring pass-through opening d and an outer peripheral surface of the diameter-reduced cylindrical part b is provided with a plural of removal prevention peripheral striped protrusions e.

The conventional cap a for wiring pass-through hole is just loosely fitted into the wiring pass-through hole b in the top board A and therefore if this cap tries to be fitted into the wiring pass-through hole b provided in a vertical wall such as the side board, then the cap will be possibly reluctantly removed out of the side board due to vibration or other outer force applied thereto.

There is disclosed in Patent Document JU 7-24135 a cap for wiring pass-through hole suitable for being used for the side board of the desk or the like in which the aforementioned disadvantage is avoided and the brief construction thereof is illustrated in FIG. 6.

As shown in FIG. 6, the cap is provided with a duct f disposed along the bottom side of the top board of the desk D and both ends of the duct f are supported on both of the side boards g and k of the desk D while both ends of the duct f are faced to the wiring pass-through holes h provided in the side boards so as to be faced to each other. The frame-like cap i is inserted into the wiring pass-through hole h in one of the side boards g until an attaching frame portion i fully enters one of the ends of the duct f and then the frame-like cap i is fitted into the other wiring pass-through hole h in the other side board k in the same manner.

Since the caps having the construction of FIG. 6 are fitted into the duct f extending between the side boards g and k, they never fall out of the side boards g and k, but the wiring cord or cords have to pass through the duct f, which causes the flexibility to be restrained and the convenience for use to be deteriorated.

An object of the invention is to provide a cap for wiring pass-through hole adapted to be easily used not only on a horizontal surface of a top board or the like, but also on a vertical surface of a side board or the like by avoiding the disadvantage of the conventional cap for wiring pass-through hole.

DISCLOSURE OF THE INVENTION

According to the invention, there is provided a cap for wiring pass-through hole comprising first and second cylindrical members to be fitted onto an inner face of a wiring pass-through hole provided in a wall board in a manner faced to each other and having engagement means to engage the cylindrical members to each other so as to hold the wall board between them in accordance with a thickness of the wall board; first and second lid-like members to be fitted onto the inner surface of the first and second cylindrical members so as to close these cylindrical members; and removal prevention means to engage the lid-like members with the first and second cylindrical members so that the first and second lid-like members are prevented from being removed out of the first and second cylindrical members in such a manner as to be able to be released therefrom; the first and second lid-like members having first and second small quantity wiring pass-through openings defined thereby, respectively and released from the prevention of removal out of the first and second cylindrical members so as to remove away therefrom whereby the first and second cylindrical members are exposed so as to form large quantity wiring pass-through openings.

In the invention, a spacer may be held between an outer flange of at least one of the first and second cylindrical members and the wall board whereby the wall board can be more securely supported by the first and second cylindrical member.

In the cap of the invention, the engagement means to engage the first and second cylindrical members with each other may be teeth-like meshing portions formed on the first and second cylindrical members in a predetermined pitch along an axial direction thereof so as to be faced to each other, respectively. The teeth-like meshing portions may be provided along the entire periphery thereof in a continuous or peripherally spaced manner.

In the cap of the invention, the removal prevention means to prevent the first and second lid-like members from being removed out of the corresponding cylindrical members in such a manner as be able to be released therefrom may comprise inner shoulder portions formed on the first and second cylindrical members and protrusion portions formed on cylindrical frames of the first and second lid-like members so as to be removably engaged with the inner shoulder portions, respectively. As the cylindrical frames of the first and second lid-like members are engagably inserted into the first and second cylindrical members, the protrusion portions of the cylindrical members are engaged with the corresponding inner shoulder portions of the first and second cylindrical members whereby the first and second lid-like members are prevented from being removed out of the first and second cylindrical members.

In another form of the cap of the invention, the removal prevention means to prevent the first and second lid-like members from being removed out of the corresponding cylindrical members in such a manner as be able to be released therefrom may comprise removal prevention axial pressurization portions formed on the first and second cylindrical members, respectively and removal prevention non-axial pressurization portions formed on the first and second lid-like members so as to be resiliently forced against the removal prevention axial pressurization portions of the first and second cylindrical members. As the removal prevention non-axial pressurization portions of the first and second lid-like members are forced into the removal prevention axial pressurization portions of the first and second cylindrical members, the first and second lid-like members are prevented from being removed out of the first and second cylindrical members.

In further form of the cap of the invention, the removal prevention means to prevent the first and second lid-like members from being removed out of the corresponding cylindrical members in such a manner as be able to be released therefrom may comprise inner shoulder portions formed on the first and second cylindrical members and at least two pawl pieces formed on the first and second lid-like members and having protrusion formed at their leading ends. As the pawl pieces are resiliently meshed with the corresponding first and second cylindrical members so that the protrusions of the leading ends of the pawl pieces are engaged with the inner shoulder portions of the first and second cylindrical members, the first and second lid-like members are prevented from being removed out of the first and second cylindrical members.

In this manner, since the first and second cylindrical members are fitted into the wiring pass-through hole in the wall board from both sides thereof whereby the wall board is held in accordance with the thickness of the wall board and the first and second lid-like members are engaged with the corresponding first and second cylindrical members while they are prevented from being removed out thereof whereby the first and second cylindrical members are closed, the first and second cylindrical members can be positively attached to the wall board in spite of the thickness of the wall board and therefore the cap is never removed out of the wall board even though it is attached to the vertical surface such as the side board of the desk.

In addition thereto, since the first and second lid-like members close the wiring pass-through hole, the appearance is never damaged and furthermore, normally the wiring cord or cords can pass through the small quantity wiring pass-through opening in the first and second lid-like members. In case of the increasing number of the wiring cords, the large inner peripheral face of the first and second cylindrical members are exposed so as to be more largely opened, by removing the first and second lid-like members out of the first and second cylindrical members, the cylindrical members themselves may be used for large quantity wiring pass-through opening.

Furthermore, as the spacer is inserted between the wall board and at least one of the cylindrical members, the cylindrical members can more positively hold the wall board between them and as the engagement means to engage the first and second cylindrical members to each other comprises teeth-like meshing portions provided on the cylindrical members to be meshed with each other, the wall board can be positively held between the first and second cylindrical members in accordance with the thickness of the wall board.

The removal prevention means to prevent the first and second lid-like members from being unwillingly removed out of the first and second cylindrical members comprises the removal prevention inner shoulder portions on the cylindrical members and the leading end protrusion portions on the cylindrical frames of the lid-like members whereby the protrusion portions of the cylindrical members are engaged with the inner shoulder portions of the cylindrical members, comprises the removal prevention axial pressurization portions on the cylindrical members and the removal prevention non-axial pressurization portions on the lid-like members whereby the lid-like members are fitted into the cylindrical members so that these pressurization portions are resiliently engaged with each other so as to fully provide a frictional resistance thereto, or comprises the inner shoulder portions on the cylindrical members and the pawl pieces on the lid-like members whereby with the pawl pieces of the lid-like members resiliently and engagably inserted into the cylindrical members so that the protrusion portions of the pawl pieces are engaged with the inner shoulder portions of the cylindrical members, the first and second lid-like members are more positively prevented from being unwillingly removed out of the first and second cylindrical members.

BRIEF DESCRIPTION OF THE DRAWINGS

FIG. 1 illustrates a cap for wiring pass-through hole according to one form of embodiment of the invention wherein FIG. 1A is a front view of the cap, FIG. 1B is a vertical cross sectional view of the cap in the state where it is used and FIG. 1C is an enlarged vertical cross sectional view of a part of the cap shown in FIG. 1B;

FIG. 3 illustrates further form of a second lid-like member used for the invention wherein FIG. 3A is a back view of the lid-like member and FIG. 3B is a cross sectional view of the lid-like member taken along a line B—B of FIG. 3A;

FIG. 4 illustrates a first cylindrical member used for the invention wherein FIG. 4A is a side view of the cylindrical member and FIG. 4B is a cross sectional view thereof;

FIG. 5 illustrates a conventional cap for wiring pass-through hole wherein FIG. 5A is a side view of the cap in the state where it is used and FIG. 5B is a plan view thereof; and FIG. 6 illustrates another conventional cap for wiring pass-through hole in the state where it is used wherein. FIG. 6A is a front view of the cap with a portion broken away and FIG. 6B is an enlarged cross sectional view of a principal part thereof.

BEST MODE OF EMBODIMENT OF INVENTION

Figure 1:
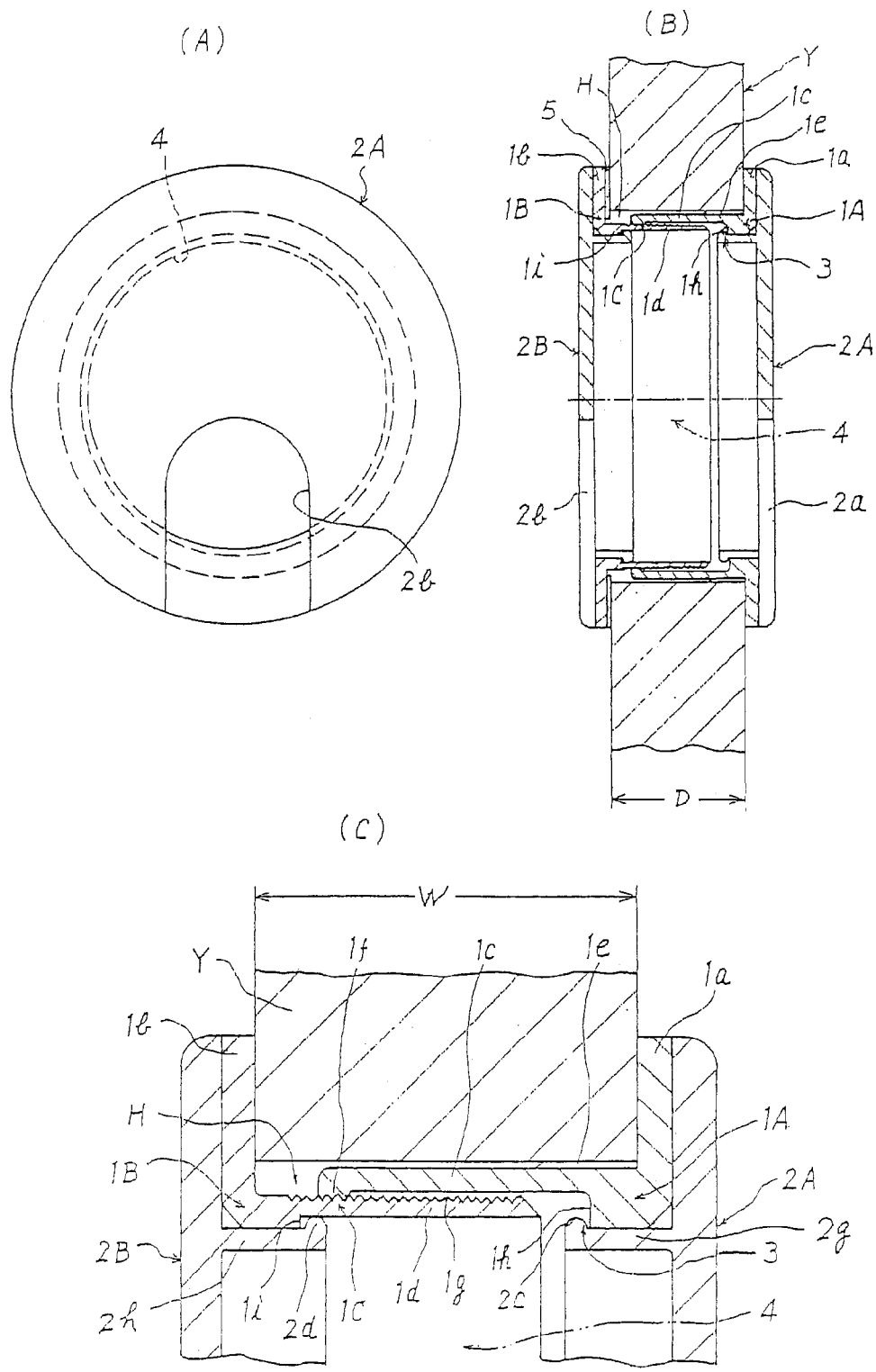

A cap for wiring pass-through hole according to one form of embodiment of the invention will be explained in details with reference to FIG. 1.

The cap for wiring pass-through hole comprises first and second cylindrical members 1A and 1B to be fitted onto a wiring pass-through hole H provided in a vertical wall board Y such as a side board of a desk from both sides thereof and engaged with each other in accordance with a thickness W of the wall board Y, first and second lid-like members 2A and 2B having cylindrical frames 2g and 2h to be fitted into the openings of the first and second cylindrical members 1A and 1B, respectively, engagement means 1C to engage the first and second cylindrical members 1A and 1B to each other within the wiring pass-through hole H and removal prevention means 3 to prevent the first and second lid-like members 2A and 2b from being removed out of the first and second cylindrical members 1A and 1B, respectively in such a manner as to be able to be released from the first and second cylindrical members 1A and 1B.

The first and second lid-like members 2A and 2B have small quantity wiring pass-through openings 2a and 2b, respectively and therefore these lid-like members 2A and 2B close the major portions of the openings of the first and second cylindrical members 1A and 1B in the state where the lid-like members 2A and 2B are fitted into the cylindrical members 1A and 1B, but a small quantity of wiring cords can pass through the small quantity wiring pass-through openings 2a and 2b whereby the wiring processing can be carried out.

With the first and second lid-like members 2A and 2B removed out of the first and second cylindrical members 1A and 1B, the entire cross sections of the inner peripheral surfaces of the first and second cylindrical members 1A and 1B are opened so that the large quantity wiring pass-through opening 4 is formed, a large quantity of wiring cords pass through the large quantity pass-through opening 4 whereby the large quantity wiring processing can be carried out.

Figure 4:
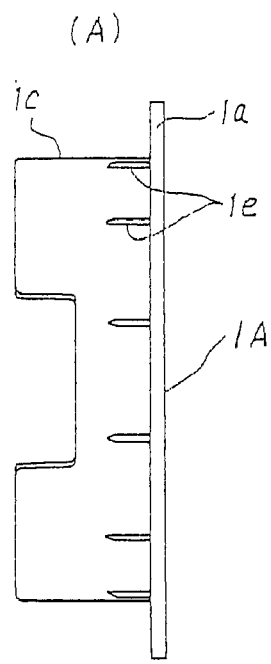
Figure 4:
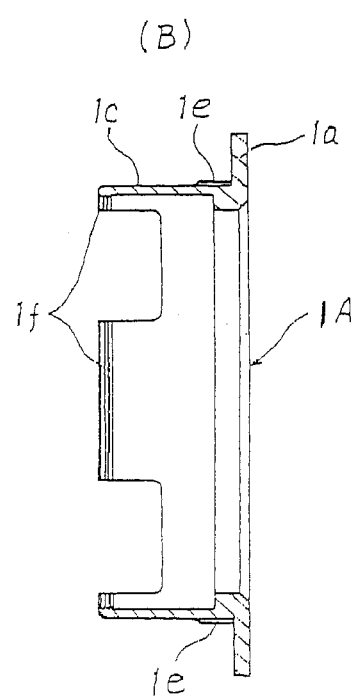
Figure 5:
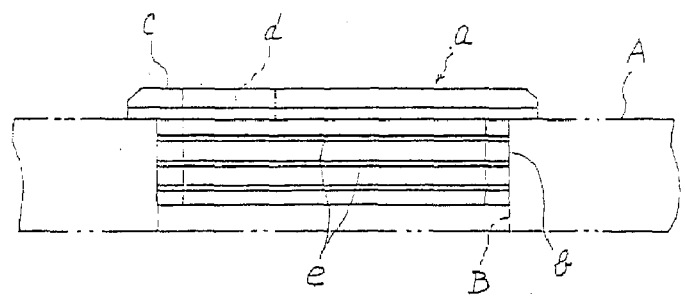
Figure 5:
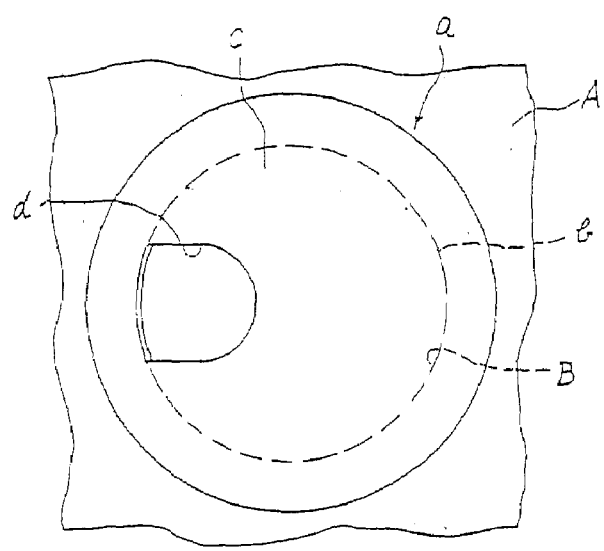
Figure 6:
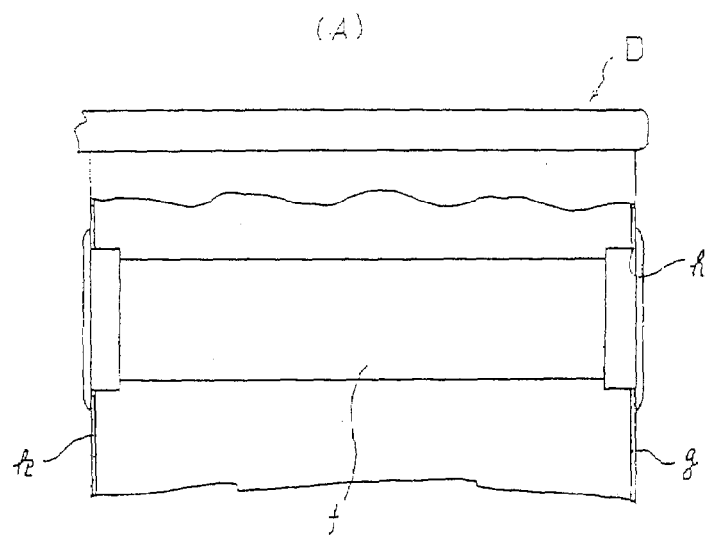
Figure 6:
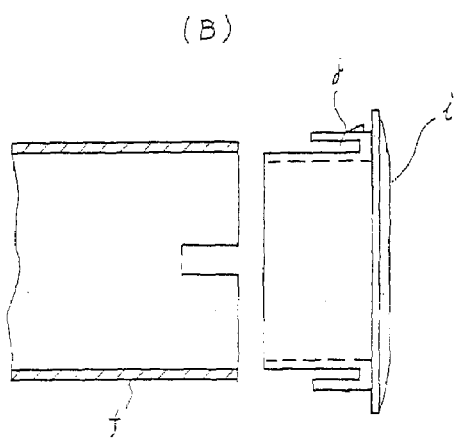

As shown in FIGS. 1B and 1C, the first and second cylindrical members 1A and 1B comprise outer flanges 1a and 1b engaging both faces of the wall board Y, respectively when they are fitted into the wiring pass-through hole H and cylindrical portions 1c and 1d to be inserted into and engaged with the wiring pass-through hole H. As shown in FIGS. 4A and 4B, there are provided a plural of striped protrusions 1e adjacent to the outer flange 1a on the outer surface of the cylindrical portion 1c of the first cylindrical member 1A in a spaced manner. These striped protrusions 1e serves to prevent the first cylindrical member 1A from unwillingly rotating within the wiring pass-through hole H.

In the illustrated form, the engagement means 1C comprises a plurality of saw-teeth-like meshing or interlocking portions 1f protruding inwardly from and formed on the free end of the cylindrical portion 1c of the first cylindrical member 1A in a spaced manner in the peripheral direction (see FIG. 4B). A plurality of saw-teeth-like meshing or interlocking portions 1g are provided on the outer face of the cylindrical portion 1d of the second cylindrical member 1B to be meshed with the saw-teeth-like meshing portions 1f. The meshing portions 1g of the second cylindrical member 1B are formed in an elongated manner in the axial direction. Therefore, a wide range of thicknesses of the wall board Y can be accommodated. The first and second cylindrical members 1A and 1b can maintain the meshing portions 1f and 1g meshed with each other while they hold the wall board Y between them whereby the wall board Y can be gripped by the outer flanges 1a and 1b.

In case that the engagement means 1C is short of the length with which the wall board is held between the first and second cylindrical members, a spacer 5 of appropriate thickness may be inserted between the wall board Y and the outer flange 1b as shown in FIG. 1B. The spacer 5 serves to compensate the shortage of the holding length.

In the illustrated form, the removal prevention means 3 comprises inner shoulder portions 1h and 1i formed on the inside of the cylindrical portions 1c and 1d of the first and second cylindrical members 1A and 1B and striped protrusion portions 2c and 2d of semicircular cross section formed on the edges of the cylindrical frames 2g and 2h of the first and second lid-like members 2A and 2B. As the cylindrical frames 2g and 2h are engagably inserted into the cylindrical portions 1c and 1d of the first and second cylindrical members 1A and 1B, the protrusion portions 2c and 2d at the edges of the cylindrical frames 2g and 2h resiliently engage the inner shoulder portions 1h and 1i of the cylindrical portions 1c and 1d whereby the first and second lid-like members 2A and 2B are prevented from being unwillingly removed out of the first and second cylindrical members 1A and 1B.

Figure 2:
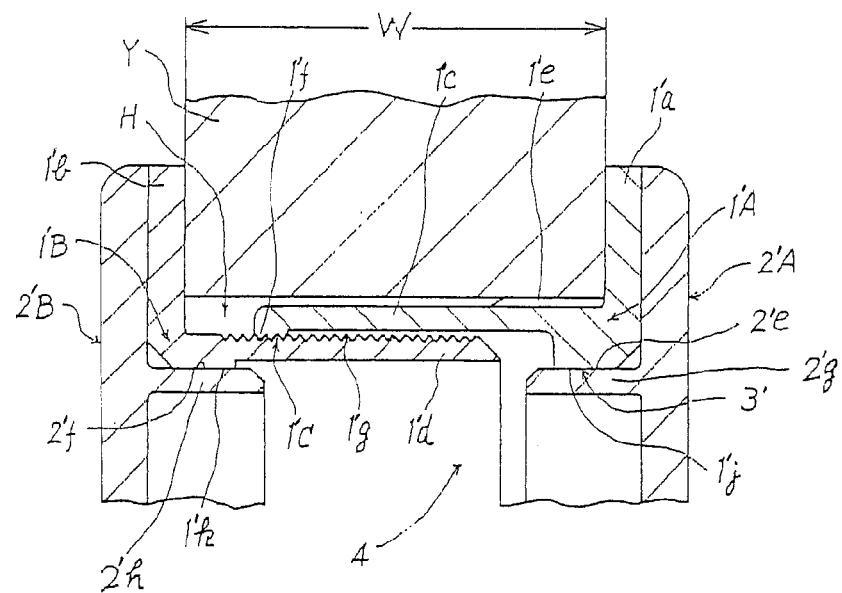
FIG. 2 is an enlarged cross sectional view of a cap for wiring pass-through hole according to another form of embodiment of the invention.

A removal prevention means 3' in another form is shown in FIG. 2. This removal prevention means 3' comprises axial pressurization portions 1'j and 1'k formed by the cylindrical portions 1'c and 1'd themselves of the first and second cylindrical members 1'A and 1'B, respectively and non-axial pressurization portions 2'e and 2'f formed by the cylindrical frames 2'g and 2'h themselves of the first and second lid-like members 2'A and 2'B, respectively. The non-axial pressurization portions 2'e and 2'f (cylindrical frames 2'g and 2'h) of the first and second lid-like members 2'A and 2'B are forced into the axial pressurization portions 1'j and 1'k (cylindrical portions 1'c and 1'd) of the first and second cylindrical members 1'A and 1'B and the first and second lid-like members 2'A and 2'B are prevented from being unintentionally or unwillingly removed out of the first and second cylindrical members 1'A and 1'B by frictional resistance based on the resilient engagement of the pressurization portions. This is true because the pressurization portions 2'e and 2'f are forced into the pressurization portions 1'j and 1'k.

Figure 3:
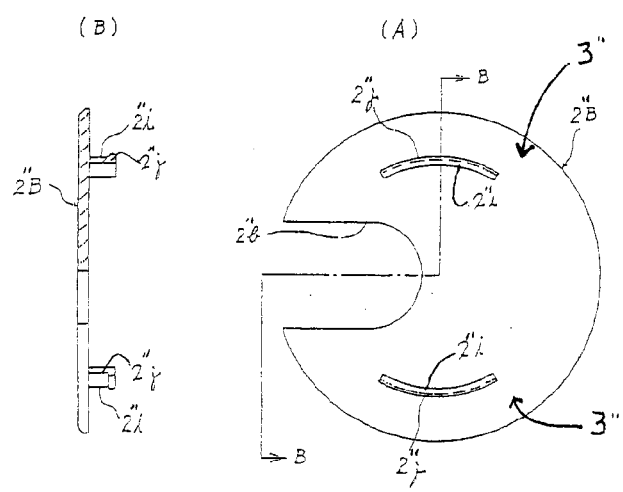

A removal prevention means 3" in a further form is shown in FIG. 3. The removal prevention means 3" of this form comprises at least two pawl pieces 2"i formed on the first and second lid-like members 2"A and 2"B and having protrusion 2"j formed at their leading ends. As the pawl pieces 2"i are resiliently meshed with the not shown inner shoulder portions formed on the first and second cylindrical members 1"A and 1"B respectively in the same manner as those in the form of FIG. 1 so that the protrusions 2"j at their leading ends are engaged with the inner shoulder portions of the first and second cylindrical members 1"A and 1"B whereby the first and second lid-like members 2"A and 2"B are prevented from being removed out of the first and second cylindrical members 1"A and 1"B.

In this manner, since the first and second cylindrical members 1"A and 1"B are fitted into the wiring pass-through hole H in the wall board Y from both sides thereof, they are held in accordance with the thickness W of the wall board Y. In addition thereto, the first and second lid-like members 2"A and 2"B are engaged with the corresponding first and second cylindrical members 1"A and 1"B while they are prevented from being removed so that the first and second cylindrical members 1"A and 1"B are closed. The first and second cylindrical members 1"A and 1"B can be positively attached to the wall board Y in spite of the size W of the thickness of the wall board Y and therefore the cap never falls away even though it is attached to the vertical surface such as the side board of the desk.

Since the first and second lid-like members 2"A and 2"B close the wiring pass-through hole H in the wall board Y, the holes do not detract from the wall board appearance. Furthermore, the wiring cord or cords can usually pass through the small quantity wiring pass-through openings 2"b in the first and second lid-like members 2"A and 2"B. Tn case of the increasing number of the wiring cords, by removing the first and second lid-like members 2"A and 2"B out of the first and second cylindrical members 1"A and 1"B, the large inner peripheral surfaces of the first and second cylindrical members 1"A and 1"B are exposed. This provides a larger opening so that the cylindrical members themselves may be used for large quantity wiring pass-through opening 4.

Referring to the illustrated embodiments, as the spacer is inserted between the wall board Y and at least one of the cylindrical members, the cylindrical members can more positively hold the wall board Y between them. Further, the saw-teeth-like meshing portions, which are the engagement means engage the first and second cylindrical members to each ocher, can positively hold the wall board Y between the first and second cylindrical members in accordance with various thicknesses W of the wall board Y.

The removal prevention means in the illustrated embodiments inhibits the unintentional removal of the lid-like members from the first and second cylindrical members. To that end, the inner shoulders 1$h$ and 1$i$ of the cylindrical members 1A and 1B may be provided as shown in the embodiment of FIG. 1. In the embodiment of FIG. 2, the axial pressurized portions 1'$j$ and 1'$k$ of the cylindrical members 1'A and 1'B cooperate with the non-axial pressurization portions 2'$e$ and 2'$f$ of the lid-like members 2'A and 2'B. In the embodiment of FIG. 3., the pawl pieces 2"$i$ on the lid-like members 2"A and 2"B are resiliently meshed with inner shoulders (not shown) on the cylindrical members 1"A and 1"B.

POSSIBILITY OF UTILIZATION IN INDUSTRIES

According to the cap for wiring pass-through hole of the invention, the cap can be applied not only for a horizontal surface of a top board of a desk or the like, but also on a vertical surface of a side board or the like. Further, the cap has a broad range of applications since the cap comprises the cylindrical members and the lid-like members and can be applied for large or small quantity of wiring by attaching the lid-like members to the cylindrical members or by removing the lid-like members out of the cylindrical members.

The invention claimed is:

1. A cap for wiring pass-through hole comprising first and second cylindrical members to be fitted onto an inner face of a wiring pass-through hole provided in a wall board in a manner faced to each other and having engagement means to engage said cylindrical members to each other so as to hold said wall board between them in accordance with a thickness of the said wall board; first and second lid-like members to be fitted onto inner surfaces of said first and second cylindrical members so as to close these cylindrical members; and removal prevention means to engage said first and second lid-like members with said first and second cylindrical members so that said first and second lid-like members are prevented from being removed out of said first and second cylindrical members in such a manner as to be able to be released therefrom; said first and second lid-like members having first and second small quantity wiring pass-through openings defined thereby, respectively and released from the prevention of removal from said first and second cylindrical members so as to be removed therefrom whereby said first and second cylindrical members are exposed so as to form a large quantity wiring pass-through opening.

2. A cap for wiring pass-through hole as set forth in claim 1, and wherein a spacer is held between an outer flange of at least one of said first and second cylindrical members and said wall board.

3. A cap for wiring pass-through hole as set forth in claim 1, and wherein said engagement means comprises teeth-like meshing portions formed on superposed portions of said first and second cylindrical members in a faced manner so as to be meshed with each other.

4. A cap for wiring pass-through hole as set forth in claim 1, and wherein said removal prevention means comprises inner shoulder portions formed on cylindrical portions of said first and second cylindrical members, respectively and cylindrical frames formed on said first and second lid-like members, respectively and having protrusion portions provided at their leading edge so as to be removably engaged with said inner shoulder portions, respectively whereby said protrusion portions of said cylindrical frames are engaged with said inner shoulder portions of said first and second cylindrical members so that said first and second lid-like members are prevented from being removed out of said first and second cylindrical members.

5. A cap for wiring pass-through hole as set forth in claim 1, and wherein said removal prevention means comprises axial pressurization portions formed on said first and second cylindrical members, respectively and non-axial pressurization portions formed on said first and second lid-like members so as to be fitted into and resiliently forced against said axial pressurization portions whereby said non-axial pressurization portions are fitted into and resiliently forced onto said axial pressurization portions of said first and second cylindrical members so that said first and second lid-like members are prevented from being removed out of said cylindrical members.

6. A cap for wiring pass-through hole as set forth in claim 1, and wherein said removal prevention means comprises inner shoulder portions formed on said first and second cylindrical members and at least two pawl pieces having protrusion portions formed at their leading ends to be engaged with said inner shoulder portions whereby said pawl pieces are resiliently inserted into said first and second cylindrical members and their leading end protrusion portions of said pawl pieces are engaged with said inner shoulder portions so that said first and second lid-like members are prevented from being removed out of said first and second cylinder members.

* * * * *